Nov. 26, 1940.   L. D. GOFF   2,222,612
FLUID SEAL CONSTRUCTION
Filed July 25, 1938
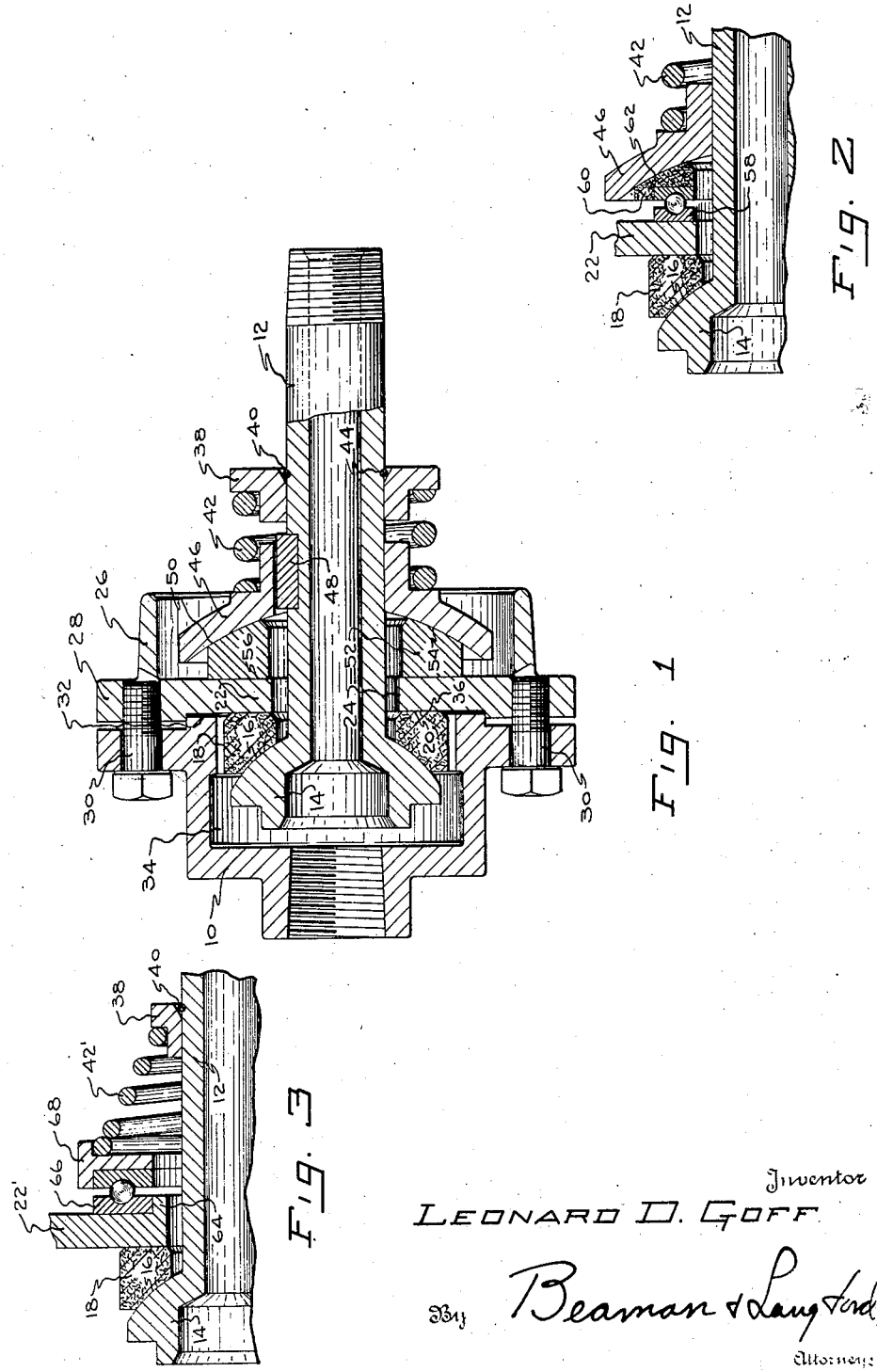
Inventor
LEONARD D. GOFF
By Beaman & Langford
Attorneys Patented Nov. 26, 1940

2,222,612

UNITED STATES PATENT OFFICE 2,222,612

FLUID SEAL CONSTRUCTION

Leonard D. Goff, Three Rivers, Mich., assignor to The Johnson Corporation, Three Rivers, Mich., a corporation of Michigan Application July 25, 1938, Serial No. 221,072

5 Claims. (Cl. 285—91)

The present invention relates to self-aligning seals and associated seal structure having angular and lateral flexibility or adjustment.

In rotary joints, rotating shafts, etc., embodying fluid sealing, misalignment due to errors in manufacture, installation, and those produced by operation necessitate that the seal have some degree of self-alignment and adjustability if effective sealing is to result under operating conditions.

The principles of the invention have been illustrated in connection with a rotary joint of the general type disclosed in my Patent No. 1,929,635, granted October 10, 1933. A comparison of the present disclosure with that of this patent will show that I have materially simplified the construction through the use of a single sealing ring. Another outstanding difference resides in the location of the spring on the outside. The single sealing ring construction is further characterized by the fact that the sealing is done with pressure so that with increase in pressure, a corresponding increase in pressure acts upon the sealing surfaces.

Thus, one of the objects of the present invention is to provide an improved self-aligning angularly and laterally adjustable seal of improved construction.

Another object is to provide a sealing structure embodying a single sealing ring in a construction such as a rotary joint, shaft housing or the like, which seals with pressure and provides for both angular and lateral flexibility.

A further object resides in a seal comprising a single inner sealing ring seating against the inside of a wall, upon which the ring has lateral movement and against which it is urged by resilient means exerting a thrust on the outside of said wall.

These and other objects and advantages residing in the combination and arrangement and construction of parts will appear from the following detailed description and the appended claims. Referring to the drawing, wherein several different modifications of the invention are disclosed, Fig. 1 is a cross-sectional view through a rotary steam joint embodying the present invention, Fig. 2 is a fragmentary view similar to Fig. 1 of a modified form of the present invention showing a spring thrust bearing of an anti-friction type, and Fig. 3 is a view similar to Fig. 2 of a further modified form, in which the spring thrust collar, capable of angular movement, has been replaced by a fixed collar.

It is to be understood that while I have illustrated the invention in connection with a rotary steam joint of the general character disclosed in my patent above mentioned, I do not wish to limit the invention to rotary steam joints but anticipate the general application of the principles of the invention to other fields in which seals for fluids are employed.

Referring to Fig. 1, the head 10 and the nipple 12 of the rotary joint are relatively rotated in operation. Generally speaking, the head 10 will be held against rotation, while the nipple 12 will be rotated relative thereto, as, for example, by rotating as a unit with a steam heated drying drum. The nipple 12 has a spherical flange 14 seating in a similarly shaped recess 16 of the sealing ring 18, which is preferably of a self-lubricating material, such as graphite, bronze or some other suitable material, metallic or otherwise. The face portion 20 of the ring 18 seats against the end wall 22 having an opening 24 therein considerably larger than the diameter of the nipple 12 received therein. As illustrated, the end wall 22 has a cylindrical portion 28, and it is suitably threaded to receive studs 30 for clamping the wall to the head 10, a suitable gasket 32 being provided to provide with the sealing ring 18 a fluid tight chamber 34. As in the case of the structure shown in my aforesaid patent, the engaging spherical surfaces between the flange 14 and the sealing ring 18 not only provide a seal at their points of seating but at the same time permit angular movement between the head 10 and the nipple 12 similar to a ball and socket action, while providing an effective seal in all angular positions possible for the nipple 12 to assume within the opening 24. In addition to this characteristic of angular flexibility, my improved seal is also capable of lateral movement along the inner face 36 of the wall 22, the sealing at this point taking place between the face 20 of the ring 18 and the face 31 of the wall 22. With this angular and lateral flexibility, my sealing structure will permit a considerable amount of misalignment and run-out between the parts while maintaining an effective seal.

It should be readily appreciated that the creation of any pressure within the chamber 34 will have the effect of urging the nipple 12 to the right and of urging the parts 14, 18 and 22 into tighter sealing relation, the sealing pressure varying with the pressure in the chamber 34. In order to insure proper engaging relation between the flange 14 and the sealing ring 18, a spring retaining collar 38 is supported for rotation on the nipple 12 and held against longitudinal movement to the right by a snap in ring 40 located in a groove 44 of the nipple 12. The retaining spring 42 is supported by the collar 38 at one end and by the spring thrust collar 46. In order to assure the rotation of the thrust collar 46 on the nipple 12, the former is keyed to the latter at 48. The thrust collar 46 preferably has a spherical inner surface 50, which has ball and socket action with a spring thrust bearing 52 having a similarly spherically shaped outer surface 54 and a flat inner surface 56 bearing against the outside of the wall 36. This arrangement permits the nipple 12 to assume angular positions relative to the wall 22 without distortion of the spring 42. Another advantage claimed for this arrangement over that shown in my aforesaid patent resides in the fact that the spring 42 is outside of the seal chamber and thus removed from any detrimental effects which temperatures or fluids might have thereon. The thrust bearing 52 may be similar in composition to the sealing ring 18 so as to possess self-lubricating characteristics, but it is to be understood that in the preferred form it functions solely as a thrust bearing and any sealing effect it might have is incidental and not depended upon.

In lieu of the thrust bearing 52, in the modification shown in Fig. 2 a ball bearing 58 bears against the wall 22 and is positioned within a retaining ring 60 having an outer spherical surface 62 having ball and socket action with a similarly shaped thrust collar 46.

In lieu of the ball and socket action between the spring thrust collar and the spring thrust bearing disclosed in Figs. 1 and 2 for the purpose of avoiding any distortion of the spring during angular adjustment of the nipple 12 relative to the body 10, a very practical arrangement is shown in Fig. 3 not possessing this particular feature but one that is entirely satisfactory in practice. The end wall 22 is shown as having a flange 64 which supports a ball bearing 66. The spring 42, as in the case of the disclosure of Fig. 1, acts against the spring retaining collar 38 upon the nipple 12 and a spring retaining collar 68 concentrically positioned upon the ball bearing structure 58. It will be appreciated that with the construction shown in Fig. 3 there will be some slight distortion of the spring 42 upon both lateral and angular relative adjustment between the nipple 12 and the body portion 10. No such distortion takes place in the construction shown in Figs. 1 and 2 for the reason that, as heretofore stated, as the spring thrust bearing 52 may have lateral movement along the outside of the wall 22, at the same time the spherical engaging surfaces of the spring thrust bearing 56 and the spring thrust collar 46 take care of the angular movement.

Having described my invention, what I desire to protect by Letters Patent and claim is:

1. A seal structure of the type described, comprising a housing, a member to be sealed within said housing and rotatable therein, said housing including a wall through which said member extends, a bearing surface on the inside of said wall, a spherical bearing surface on said member, a sealing ring having a spherical recess upon one side and a flat face upon the opposite side engaging with said bearing surface of said member and said bearing surface on the inside of said wall, respectively, said sealing ring being smaller in lateral dimension than said bearing surface on the inside of said wall for permitting relative lateral movement between said ring and wall, and a resilient member acting upon said member to urge the bearing surface thereof against said sealing ring and said sealing ring into sealing relation with said side wall.

2. A seal structure of the type described, comprising a housing, a fluid conducting member to be sealed within said housing and rotatable therein, said housing including a wall having an opening through which said member extends, a bearing surface upon the inner side of said wall defining a portion of said housing, a sealing ring disposed between the bearing surface of said member and the bearing surface of said wall, the size of said opening being substantially greater than the size of said member, whereby said member is capable of limited lateral and angular movement within said opening, said sealing ring being of smaller lateral dimension than said bearing surface on the inner side of said wall for permitting relative lateral movement between said ring and said wall, said sealing ring and said bearing surface being shaped to seal said member and said housing in various relative lateral and angular positions, a spring located outside of said housing and acting upon said member, means defining a spring seat for one end of said spring upon said member, a spring thrust collar upon which the other end of said spring acts, said thrust collar being mounted so as to follow the angular and lateral movement of said member.

3. In a rotary joint, a housing including a wall having an opening therethrough, a fluid conducting member loosely extending through said wall and into said housing, so as to permit angular and lateral movement, having a flange, a sealing ring disposed between said flange and the inner side of said wall, the pressure within said housing acting against said flange and said sealing ring to urge said flange against said sealing ring and said sealing ring against said wall, and a retaining spring located outside of said housing for holding said flange and sealing ring in position, said spring surrounding said member, a shoulder upon said member against which one end of said spring acts, a spring thrust collar upon said member against which the opposite end of said spring acts, said collar being keyed to said member to rotate therewith and being longitudinally slidable thereon, and a thrust bearing against which said thrust collar acts, said bearing being urged against the outer side of said wall.

4. A seal structure of the type described, comprising a body having a wall provided with an opening therein, a tubular member projecting through said opening for rotation therein, the opening through said wall being of greater lateral dimensions than those of said member for permitting angular and lateral movement of said member therein, a head on said member disposed adjacent one side of said wall, a bearing surface on said wall opposite said head, a sealing ring disposed about said member between said head and said bearing surface on said wall, said head and sealing ring having ball and socket engaging surfaces, respectively, spring means located outside of said housing, a thrust member supported with respect to said tubular member against movement away from said wall, and a second thrust member supported with respect to said body, for resisting the thrust of said spring, said spring urging said head into sealing engagement with said sealing ring and said sealing ring into sealing engagement with said bearing surface on said wall, one of said thrust members comprising a thrust bearing to permit simultaneous rotational movement of the same with said spring, said head, sealing ring, thrust members and spring being arranged to permit lateral and angular adjustment of said member with respect to said body.

5. The invention as defined in claim 4, wherein the thrust bearing comprises a thrust member in slidable engagement with the side of said wall opposite the bearing surface thereof, and a thrust collar in ball and socket bearing relationship with said thrust member.

LEONARD D. GOFF.